Oct. 31, 1961 E. L. NEWELL 3,007,000

SUBMERGED REPEATER SWITCHING SYSTEM

Filed Feb. 28, 1957 2 Sheets-Sheet 1

INVENTOR.
E. L. NEWELL

BY [signature]

ATTORNEY

Oct. 31, 1961 E. L. NEWELL 3,007,000

SUBMERGED REPEATER SWITCHING SYSTEM

Filed Feb. 28, 1957 2 Sheets-Sheet 2

INVENTOR.
E. L. NEWELL

BY

ATTORNEY 3,007,000
Patented Oct. 31, 1961

3,007,000

SUBMERGED REPEATER SWITCHING SYSTEM

Earl L. Newell, Chatham, N.J., assignor to The Western Union Telegraph Company, New York, N.Y., a corporation of New York Filed Feb. 28, 1957, Ser. No. 643,077
3 Claims. (Cl. 178—70)

Figure 1:
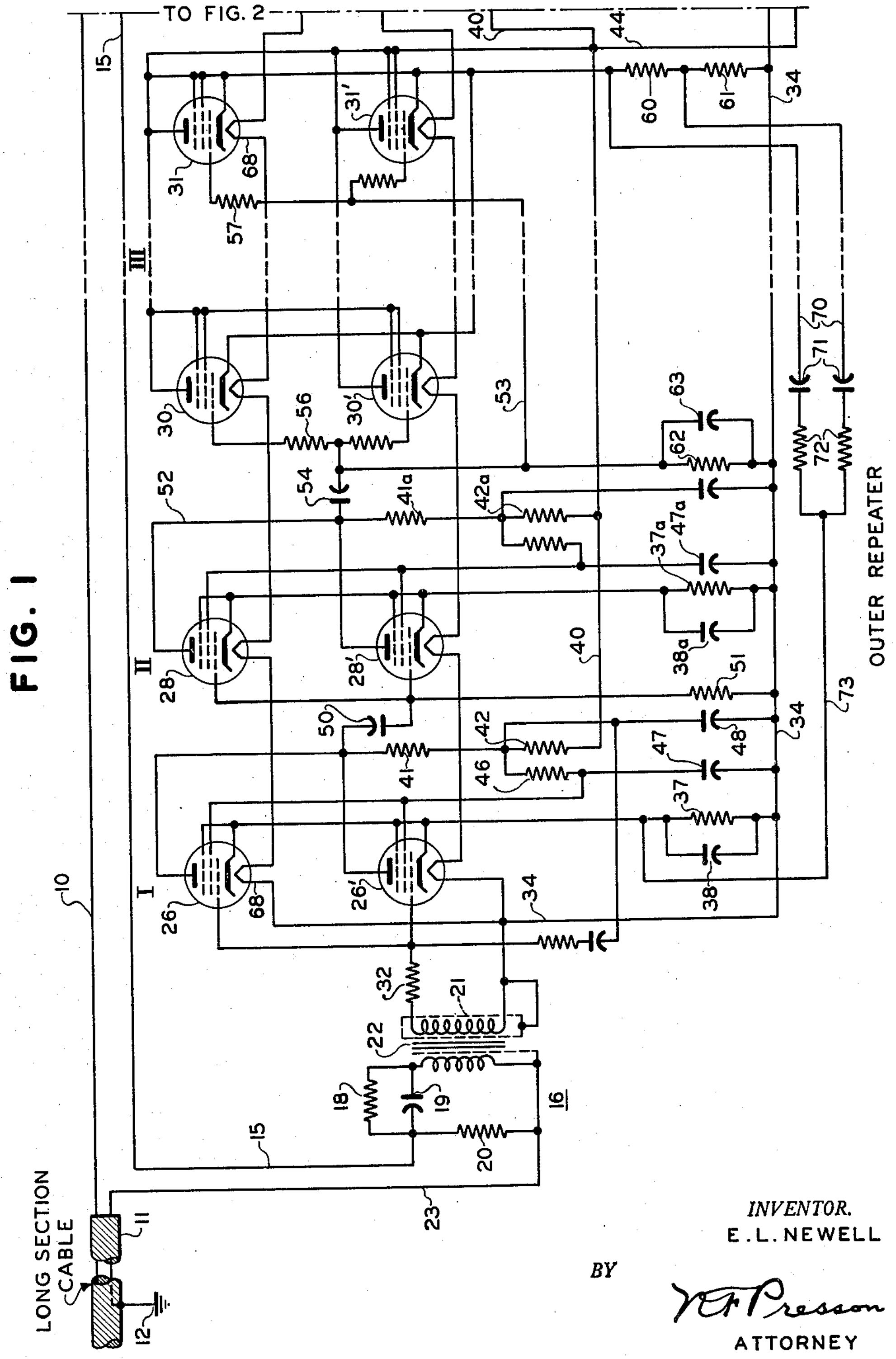

This invention relates to submerged repeater and switching systems adapted for use in submarine signaling cables, and more particularly to improved amplifier and switching arrangements for the selective control of submarine cable repeaters for utilization, testing and other purposes.

As disclosed in the U.S. patent to Wilder No. 2,683,188, issued July 6, 1954, the maximum signaling speed, and hence the signaling capacity, of an existing non-loaded telegraph submarine cable may be greatly increased by the use of a submerged repeater in a water-tight casing positioned, as on the Continental Shelf of the bed of the ocean, at a place prior to that in which the receiving shore end of the cable lies in an area of water of insufficient depth to shield the cable from electrical disturbances induced therein, and for amplifying the incoming signals to a value sufficiently high to cause the signals to override such disturbances. In such a repeater, two separate amplifiers have heretofore been provided so that in the event of failure of one amplifier a spare amplifier could be switched into service by means of signals transmitted from the terminal equipment at the shore end of the cable. Examples of such switching systems are disclosed in the aforesaid Wilder patent and also in the U.S. patents to Bramhall et al. No. 2,658,945, issued November 10, 1953, and Cannon et al. No. 2,683,188, issued July 6, 1954.

In accordance with the instant invention the maximum signaling speed of a submarine cable may again be increased by the use of two or more submerged repeaters in series, or tandem, relationship embodied in the receiving shore end of the submarine cable, the first of which repeaters, hereinafter referred to as the "outer" repeater, is positioned much farther out from the shore than the second repeater to insure that the signal level of the incoming signals will be substantially greater than the internal noise level caused by the amplifying tubes, switching contacts, etc., and also interference from other cables in the vicinity. The second repeater, hereinafter referred to as the "inner" repeater, is positioned inwardly towards the shore a considerable distance, for example, several hundred miles inwardly from the outer repeater, and approximately at the same location as that disclosed in the Wilder patent, to provide further amplification to enable the signals to override electrical disturbance encountered as the cable approaches the shore.

The inner submerged repeater ordinarily includes no spare amplifier and the switching features are held to a minimum as compared with the measures taken for the outer repeater. The reasons for this are that the auxiliary features of themselves contribute to the complexity of the system and to the probability of trouble occurring, as well as to the size and weight of the repeater housing which aggravates the handling difficulties of the cable ship. By invoking all possible precautions against defects in the components and the assemblies thereof, the amplifier vacuum tube cathodes are the only items which deteriorate appreciably with time, and the present day products give assurance of very substantial life. At the same time, since the inner repeater is in relatively shallow water, it may be raised and replaced at any season without protracted waits for favorable weather and without long loss of the cable from service. Consideration of these factors dictates a repeater of simple circuitry and with a minimum of encumbrances.

The outer submerged repeater is more readily susceptible to switching operations, and since the raising of a faulty outer repeater in deep water is costly, difficult and subject to seasonal delay, more complete switching facilities and a spare set of amplifier tubes are incorporated therein.

Accordingly it is among the objects of the invention to provide a switching system in which either the inner repeater or the outer repeater, or both, may be cut in or may be by-passed, under control of signals transmitted from the adjacent shore station, whereby various conditions may be set up for testing or other purposes. The inner repeater is of such design that it provides substantial gain at speeds below the normal speed for the two-repeater system and therefore should the outer repeater fail it can be by-passed to allow the cable to continue operation at a speed which still represents a very substantial increase in signal capacity over that of a non-repeatered cable. By means of the switching circuit disclosed herein, a number of conditions may be set up: With the inner repeater cut out, the outer repeater may be either cut in or cut out or switched to any of several test positions. Also the cable conductor may be connected through for operation in either direction without any repeaters or for operation in reverse direction with repeaters at the far end on those cables equipped with repeaters at each end.

In addition to the foregoing a test resistor equivalent to the "hot" resistance of the heaters in the amplifier tubes, inserted in series with a rectifier and the normal heater circuit resistor, permit the condition of the heaters and the rectifier of the outer repeater to be checked by measurements at the shore terminal. Also, the cable may be opened at the outer repeater with the repeater disconnected for test purposes, with the exception of the switching circuit that is permanently connected to the cable. The outer repeater has two sets of amplifier tubes, one of which is a spare set, and preferably are so connected as to utilize the preamplifier input and signal-shaping network, the interstage resistance-capacitance coupling, and the decoupling and negative feedback networks, common to the two sets of amplifier tubes, thereby to enable the size of the repeater housing to be greatly reduced, to reduce and simplify the required circuit components, and substantially to reduce the cost of the repeater unit.

Figure 2:
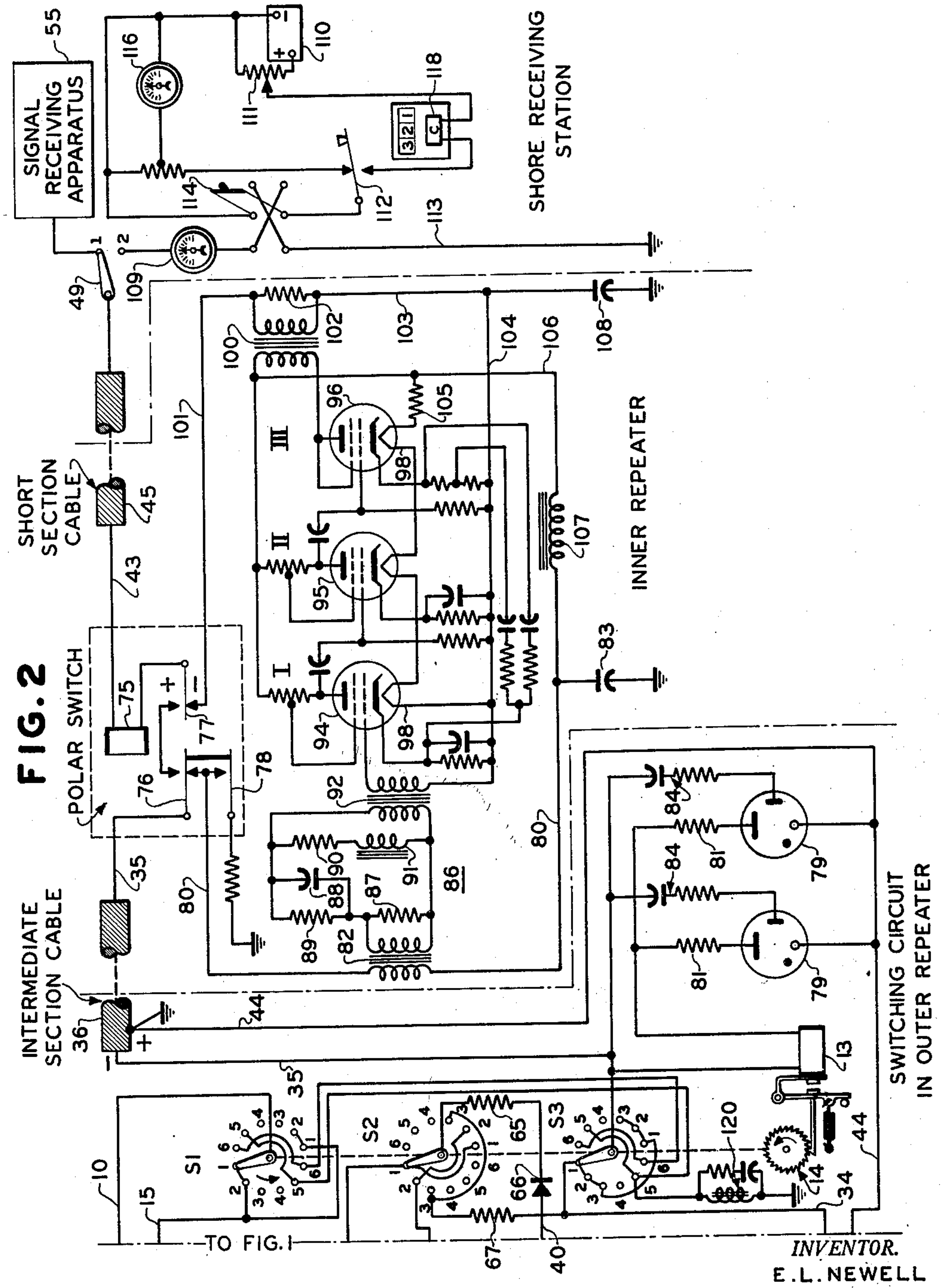

Other objects and advantages will be apparent from the following description of an illustrative embodiment of the invention, taken in connection with the accompanying drawings in which:

FIG. 1 is a circuit diagram showing details of the outer repeater amplifier unit in the cable circuit, and FIG. 2 is a circuit diagram showing a switching and control circuit in accordance with the invention, and also details of the inner repeater unit.

The outer repeater amplifier, as shown in FIG. 1, preferably is a three stage single-sided amplifier, the three stages being indicated at I, II, III. The amplifier tube of the first stage is indicated by reference numeral 26, and the second stage is indicated by reference numeral 28. The third stage is provided with a plurality of tubes in multiple, preferably six tubes, the first and last of which tubes are designated by reference numerals 30 and 31 respectively, thereby to provide adequate signal output level, it being understood that the additional tubes are present between the first and last tubes shown. A second or spare set of amplifier tubes 26', 28', and 30'—31', are provided. With the exception of the filaments or heater units 68 of the various tubes, the corresponding tube elements of the two sets are connected in multiple, stage by stage. The two heater circuits, each with eight tubes in series, terminate at separate switch positions and as hereinafter explained in detail, one or the other sets of tubes may be selected and powered as desired. Common to both sets are the preamplifier input and signal shaping network, the inner stage resistance-capacitance coupling, the decoupling and negative feedback networks, and other circuit elements, hereinafter described. The output impedance with six tubes in multiple in stage III is suitable for direct coupling to the intermediate section 36 of the cable which is thus indicated by the legend on FIG. 2. This makes unnecessary the use of an impedance matching output transformer and thus avoids certain distortions of signal transients which are difficult to correct elsewhere. The plate circuit of the amplifier is connected to earth, and the cathode or negative side of the amplifier is connected to the cable conductor. The repeater power supply from apparatus 55 at the receiving cable station depicted in FIG. 2 is poled minus to cable and plus to earth, which arrangement is used to minimize electrolytic corrosion of the repeater case and the adjacent cable armoring.

Referring again to FIG. 1, the outer repeater has its input circuit connected to the long section of the cable 11, which is the portion thereof incoming from the distant shore station. Message signals from the distant sending station are transmitted over the conductor 10 of cable 11, and by means of conductor 12 to the wiper arm of a switch bank S1 of a rotary switch, FIG. 2, the arm of the switch bank S1 normally being positioned on its contact 1 which is connected by a strap to its contact 2 and thence over conductor 15 to the preamplifier input and signal shaping input 16, FIG. 1. This network comprises a paralleled resistor 18 and capacitor 19 connected to one end of primary winding of signal input transformer 22, the other end of which winding is returned to a sea earth 12 over conductor 23 to the cable armor. A resistor 20 connects conductor 15 and the contact 2 of switchbank S1 to the cable ground conductor 23. The rotary switch has three switch arms S1, S2 and S3, which are mechanically coupled to form a gang switch; the switch may selectively be stepped to any of six positions by means of a stepping magnet 13 and pawl and ratchet 14 in a manner hereinafter described.

The secondary winding of the transformer 22 has one end thereof connected to the control grid of tube 26 through resistor 32. The other end of the secondary winding is connected by a conductor 34, and one of the contacts 1, 2 or 3 of a rotary switchbank S3, FIG. 2, to cable conductor 35 of the intermediate section 36 of the cable. Negative operating potential is supplied to the conductor 34 from the shore receiving station over a circuit which includes conductor 35 and the switch bank S3 in a manner hereinafter described in detail. Referring again to FIG. 1 bias is supplied to the tube 26 by cathode resistor 37 and capacitor 38. The anode of tube 26 is supplied with positive potential from grounded conductors 40 and 44 through anode resistors 41 and 42, a conductor 44 being connected to the grounded sheath of the intermediate cable section shown in FIG. 2. The series combination of resistor 37 and capacitor 38 connecting the anode and control grid of the tube 26, degeneratively feeds a portion of the output signal back to the grid thereby suppressing the tendency toward oscillation due to the connection of the cathode with the amplifier output circuit. The screen grid of tube 26 connects to the common point of serially connected resistor 46 and bypass capacitor 47. The other end of capacitor 47 connects to conductor 34, and the other end of resistor 46 connects to the common point of resistors 41 and 42. Capacitor 48 connects conductor 34 with the junction point of anode resistors 41 and 42.

The output of tube 26 is fed to the control grid of tube 28 of stage II through coupling capacitor 50. Bias is supplied to the tube 28 by a resistor **37*a* and a capacitor 38*a* in the manner of tube 26** of stage I, and a resistor

51 connects the control grid with the conductor 34. The anode of tube 28 is supplied with positive potential by the grounded conductors 40 and 44 and anode resistors **41*a* and 42*a***.

The output of tube 28 is fed, by means of conductors 52 and 53, and the coupling capacitor 54 to the control grids of a series of the parallel connected tubes 30 to 31 of stage III. As hereinbefore stated, only two parallel connected tubes 30 and 31 are shown in the drawings, but preferably four additional parallel connected tubes are in circuit in the place indicated by dotted lines extending between the first and last tubes of this stage. It is to be understood that any desired number of such tubes may be so connected. Cathode resistors 60 and 61 connect the cathodes of tubes 30—31 to conductor 34, and a parallel combination of resistor 62 and capacitor 63 connects the junction of resistor 56 and capacitor 54 to the conductor 34.

The output of the amplifier is resistance-coupled to the intermediate cable section 36 through switch bank S3 and a parallel circuit from switch S3 through the heater circuits 68, switch S2, resistor 65, rectifier 66 and grounded conductors 40 and 44 to the cable earth. The output coupling resistance conveniently comprises the filaments or heater elements 68 of the tubes 26, 28 and 30 to 31, in series with any additional resistance, such as the resistance 65, FIG. 2, as may be necessary for efficient coupling. It will be noted that the tube heaters 68 perform a dual function since in addition to the cathode heating function the resistance of the heaters is employed as a coupling resistance thereby eliminating the necessity of a separate resistance for this purpose. This is an important feature in an amplifier for use in a submarine cable circuit inasmuch as the power requirement of the amplifier and the losses therein are minimized.

Negative feedback for the outer amplifier is provided by a circuit including two conductors 70, capacitors 71, resistors 72 and a conductor 73, connecting the cathodes of the parallel connected output tubes 30 and 31 with the cathode of tube 26. This feedback network functions to feed intermediate frequency components of the signal pulses to the cathode of the input stage to suppress such frequencies and change the shape of the signal pulses. Capacitors 38 and **38*a* in the cathode circuits of tubes 26 and 28**, respectively, also function to change the wave shape of received signals by suppressing low frequency components thereof.

The wave shaping network 16 hereinbefore referred to has two functions. It serves as an impedance matching network to match the impedance of the cable section 11 with the impedance of transformer 22. Further, in conjunction with the feedback circuits, it reshapes the message pulses by shifting the low frequency components thereof with respect to the high frequency components. The shape of a message pulse as received over cable 11 at the repeater is such that the leading edge of the wave has a slope insufficiently steep for proper operation of the receiving apparatus. Also, the amplitude of this wave would produce too great a swing of the grid of tube 26. Hence the wave shaping network is provided to reshape the incoming wave and cause it to have a steeper leading edge with a relatively smaller amplitude. The parallel combination of resistor 18 and capacitor 19 in series with the cable circuit presents a smaller impedance to high frequency components of a signal pulse than to low frequency components. The primary winding 21 of transformer 22 is designed to have low inductance, and being shunted across the cable circuit offers a higher impedance to high frequency components of a signal than to low frequency components. Both of these arrangements cooperate to shift the relative phase of the low frequency components of a signal with respect to the high frequency components to transform the shape of the wave to the desired configuration. Capacitor 19 and primary winding 21 of transformer 22 may be tuned to approximately 1.5 times the dot frequency to peak the received signals at this frequency.

Referring to FIG. 2, with the polar switch 75 in the position shown, the signal output of the outer amplifier is applied, from cable section 36, to an isolating transformer 82 at the receiving end of the amplifier of the inner repeater, the circuit comprising the cable conductor 35, armature 76 and the adjacent lower contact of the polar switch, conductor 80, primary winding of the transformer 82, and a capacitor 83 to earth. The secondary of transformer 82 is connected to a preamplifier shaping network 86 which comprises an input shunt resistor 87, a receiving capacitor 88 and shunt resistor 89. A magnetic shunt comprising a resistor 90 and an inductor 91 is bridged across the primary winding of an input transformer 92 for matching the low impedance shaping network to the high impedance input. The amplifier may be similar to that of the outer repeater, and has three stages I, II and III. For simplicity, the last stage III is diagrammatically indicated by one tube 96, although actually it will comprise six tubes like the tube 96 with their elements connected in parallel, except that the filaments 98 of all the tubes 94 to 96 are connected in series in the manner of the filament circuits of the amplifier in the outer repeater.

The types of tubes and the circuitry thereof may be substantially identical to that of the amplifier in the outer repeater, but the amplifier output of the inner repeater is coupled to the short section 45 of the cable through a transformer 100 instead of being resistance-coupled. The reason for the transformer coupling is to provide a sufficiently low resistance path for the heater current which passes through the inner repeater to the outer repeater. With the polar switch 75 in the position shown, the heater current is supplied from negative battery supply in the receiving apparatus 55, the circuit comprising the switch 49, cable conductor 43, operate winding of the polar switch 75, armature 77 and the adjacent lower contact, conductor 101, secondary winding of transformer 100 and its shunt resistor 102, conductors 103 and 104, through the heater elements 98 in series, a heater resistor 105, conductor 106, filter inductor 107, conductor 80, primary winding of transformer 82, contact and armature 76 of the polar switch, and thence through conductor 35 of the intermediate section 36 of the cable to the outer repeater.

The circuit of the output signals in the secondary winding of the transformer 100 is as follows: One end of the transformer winding is connected through conductor 101 and the polar switch to conductor 43 of the shore section of the cable, and the other end of the secondary winding 100 is connected by conductor 103 and a capacitor 108 to earth. The signals are prevented from flowing through the heater circuit to the input of the amplifier by a filter which comprises the capacitors 83 and 108 and the inductor 107.

*Switching control circuit*

As hereinbefore stated, the three-bank rotary switch S1, S2, S3 in the outer repeater is operated as a gang switch by means of the ratchet 14 and stepping magnet 13 which is caused to step by direct current switching pulses. The switching function is made selective by the use of cold cathode gas triodes 79 which are permanently connected, anodes to cable and cathodes to earth, and which do not fire when the repeater is powered, but instead respond only to switching pulses of positive polarity transmitted in the manner explained below. To fire the tubes 79 and step the switch, switching pulses of positive polarity (plus to cable conductor) are transmitted from the control circuit at the shore receiving station. Additional advantages of employing cold cathode gas triodes for this purpose are set forth in detail in the aforesaid Cannon et al. U.S. Patent No. 2,683,188. The copper oxide rectifier 66 effectively isolates the amplifiers of the outer repeater from the switching circuit so that during switching operations the amplifiers are subjected only to very low voltages, and the switching tubes 79 are not shunted directly by the low resistance heater circuit.

Referring now to the switching control apparatus at the shore receiving station, this comprises a switching battery 110, the terminals of which are shunted by a potentiometer 111 to provide variable potentials. The arm of the potentiometer 111 is connected through a pulse counter device 118 and thence to the lower contact of a key 112, the key normally being in the open position shown. A reversing switch 114 is in circuit with the lever of key 112, and with the reversing switch thrown to the right, as viewed in the figure, and the switch 49 set to its contact 2, positive potential is applied, through a milliammeter 109, to cable conductor 43. The negative pole of the battery 118 is connected to earth through a conductor 113; if the reversing switch 114 is thrown to the left, negative potential will be applied to cable conductor 43.

Before switching the outer repeater, the inner repeater must be switched to enable the switching pulses to operate on the other repeater. When the inner repeater is in the operating position, a switching signal of positive polarity is required to operate the polar switch 75 to cut the repeater out and allow the switching pulses to continue to the outer repeater. With the reversing switch 114 thrown to the right, depressing the key 112 will cause a positive switching signal to flow through a circuit comprising switch 49, cable conductor 43, the winding of polar switch 75, armature 77 and lower contact of the switch, conductor 101, secondary winding of the transformer 100 and parallel resistor 102, conductor 103 and capacitor 108 to earth. In practice, the switch S1—S3 is moved one switching step for each ten teeth on the ratchet 14 which has more teeth than those diagrammatically indicated on the drawing. A train of ten successive positive pulses are transmitted by depressing the key 112 ten times in succession for each switching position of S1—S3, since in general there is not sufficient energy in a single pulse to operate the switch from one switching position to the adjacent switching position. Therefore each such switching signal may be regarded as comprising a train of ten consecutive pulses.

This first switching signal of positive polarity will cause the polar switch 75 to operate to the cut-through position at which time its armatures 76 and 77 are in contact with the upper contacts, and the switching circuit is then connected through cable conductor 35 to the outer repeater switching circuit. The polar switch is of the "stay put" type which will not cause its armatures to leave their contacts until the flux in the operating coil is sufficiently strong to operate the armatures to their alternate positions, and the armatures will magnetically lock to their alternate positions until sufficiently large current of opposite polarity is caused to flow through the operating coil to set the switch to its opposite position. At the same time that the armature 78 of the polar switch engages its adjacent contact it provides a discharge circuit through conductor 80 for the capacitors 83 and 108. This is done to avoid excessive sparking at the contacts of the polar switch on the next operation of the switch. The voltage of the initial switching signal is made sufficiently low, by means of the adjustment of potentiometer 111, so that it will operate the polar switch but is insufficient to ionize the cold cathode tubes 79 and hence has no effect upon the stepping magnet 13. Subsequent switching signals generated by the key 112, with the potentiometer 111 adjusted so as to increase the potential to the necessary value, will now operate to fire either of the cold cathode tubes 79 and energize the electromagnet 13 to step the rotary switch 51—53 to any of its other five settable positions, corresponding to the number of switching signals transmitted, and thus the desired condition of the outer repeater may be selected.

The particular position of the rotary switch in the outer repeater is indicated by successive readings of the cable charging current through the milliammeter 109 and also by the cable discharge current registered by milliammeter 116. The counter 118 registers the number of stepping pulses sent and hence also operates to designate the particular position to which the switch has been stepped.

Assume, for example, that one set of amplifier tubes in the outer repeater has developed a fault. With the switch 49 in its position 2 the key 112 is operated to send a first switching signal of positive potential, as hereinbefore explained, to first cause the polar switch 75 to operate so that its armatures 76, 77 and their upper contacts will cause the cable circuit to bypass the inner repeater and connect the control circuit through to the outer repeater. The second switching signal produced by key 112, with an increased potential due to readjustment of potentiometer 111, will energize the stepping magnet 13 and step the rotary switch S1—S3 in the direction of the arrows from position 1 shown to position 2. In this position the heater circuit for the first set of amplifier tubes 26 to 31 is opened by switch bank S2 and the heater circuit of the spare set of amplifier tubes 26′ to 31′ is connected in circuit.

If the key 112 is again operated to send a third switching signal, this will advance the rotary switch from position 2 to position 3, at which time a test resistor 67 is connected in circuit in place of the heaters, and this permits testing of a normal outer repeater circuit with the tubes in a nonoperating condition.

A fourth switching signal, if transmitted by the key 112, will step the rotary switch to position 4, and this disconnects everything in the outer repeater except the cold cathode stepping circuit. This gives an open circuit condition of the cable-out to the outer repeater, and enables the possibility of a cable fault to be explored.

A fifth switching signal from the key 112 will step the rotary switch to position 5, at which time the conductor 35 of the cable is connected through to the conductor 10 of the long section of the cable, thus bypassing the outer repeater, except for a low pass filter 120 which connects the cable circuit to earth to provide a low resistance path for the heater current, while offering a high impedance to the cable signals. With this setting of the switch the inner repeater may be switched back into the cable circuit by a negative switching pulse from the switching control apparatus, so that the cable then may then operate without the outer repeater in the signaling circuit. The inner repeater has sufficient amplification so that the cable may be operated at a signaling speed which, while less than that obtained with both repeaters in circuit, is considerably greater than the signaling speed of a non-repeatered cable. Thus in the event of failure of both amplifiers in the outer repeater, the cable may be kept in use with the inner repeater in circuit until weather conditions permit the outer repeater to be repaired or replaced.

If six positive switching signals are transmitted, by operating the key 112, the rotary switch S1—53 will be set to its sixth position, at which time the conductor 35 of the cable is connected through to the conductor 10 of the long section of the cable, thus bypassing the outer repeater, and in this condition the cable is connected through without either repeater in the cable signaling circuit. In this condition the cable may be tested and/or may be operated in either direction at the normal non-repeatered speed of the cable, or at higher speed with repeaters connected in at the distant end of the cable in which case the cable would be operating in the reverse direction.

In the illustrative embodiment only two repeaters in series, or tandem, relationship are shown, but it is to be understood that the invention is not limited thereto since one or more additional inner repeaters, each with a polar switch or equivalent switching means, can be employed in conjunction with the outer repeater. Various modifications of the repeater amplifiers and the switching means and circuitry disclosed herein will doubtless occur to those skilled in the art without departing from the spirit and scope of the invention which is not to be regarded as limited except as defined in the appended claims.

What is claimed is:

1. A submarine cable signaling system having two repeaters connected in circuit in a cable conductor in the receiving end of the cable and comprising an inner repeater located at an appreciable distance from the shore and an outer repeater located at a considerably greater distance from the shore, the outer repeater embodying an amplifier for increasing the level of the relatively weak received signals and retransmitting them to the inner repeater for further amplification to enable the signals to override the electrical disturbances encountered as the cable approaches the shore, said inner repeater having a first switching means embodied therein and said outer repeater having a second switching means embodied therein, said first switching means comprising a polarized switch responsive to polar signals and having at least two switching positions one of which connects the inner repeater in the cable circuit and the other of which connects the cable conductor directly across the inner repeater in a manner to short-circuit the repeater thereby to cut out and bypass the inner repeater, said second switching means in the outer repeater having a plurality of testing, amplifying and operating positions in said cable circuit, means for transmitting switching signals respectively of positive and negative polarity over said cable conductor, said polarized switch being settable in response to a switching signal of one polarity to a position connecting the inner repeater in the cable circuit and settable in response to a switching signal of the opposite polarity to a position connecting the cable conductor directly across the inner repeater in a manner to short-circuit the repeater thereby to cut out and bypass the inner repeater and complete a switching circuit to the outer repeater.

2. A system according to claim 1, including means for transmitting a first switching signal of said opposite polarity at a voltage value sufficient to actuate the polarized switch to said position to cut out and bypass the inner repeater but insufficient to actuate said second switching means in the outer repeater, and for transmitting at least one subsequent switching signal of said opposite polarity at a voltage sufficiently high to actuate the second switching means to one of its settable positions.

3. A system according to claim 1, including contacts on the polarized switch operative when said switch is actuated to said position to cut out and bypass the inner repeater for connecting capacitative elements of the inner repeater to a path for discharging said elements and thereby prevent excessive sparking at the switching contacts of said switch on the next operation thereof.

References Cited in the file of this patent

UNITED STATES PATENTS

| | | |
|---|---|---|
| 2,020,318 | Jacobs | Nov. 12, 1935 |
| 2,658,945 | Bramhall et al. | Nov. 10, 1953 |

OTHER REFERENCES

Publication: "Submerged Repeater for Ocean Cable," by C. H. Cramer, from "Electrical Engineering," of July 1951; pages 566–570.